US009109524B2

(12) United States Patent
Ujiie et al.

(10) Patent No.: US 9,109,524 B2
(45) Date of Patent: Aug. 18, 2015

(54) CONTROLLER FOR INTERNAL COMBUSTION ENGINE

(71) Applicants: Shigemichi Ujiie, Tokai (JP); Yu Tamura, Obu (JP); Toshitake Sasaki, Toyota (JP); Ikuo Ando, Toyota (JP); Tsukasa Abe, Gotenba (JP)

(72) Inventors: Shigemichi Ujiie, Tokai (JP); Yu Tamura, Obu (JP); Toshitake Sasaki, Toyota (JP); Ikuo Ando, Toyota (JP); Tsukasa Abe, Gotenba (JP)

(73) Assignees: AISAN KOGYO KABUSHIKI KAISHA, Obu (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 13/894,898

(22) Filed: May 15, 2013

(65) Prior Publication Data
US 2013/0325299 A1  Dec. 5, 2013

(30) Foreign Application Priority Data

May 29, 2012  (JP) ................. 2012-122410

(51) Int. Cl.
F02D 41/22 (2006.01)
F02D 41/30 (2006.01)
F02D 41/14 (2006.01)
F02D 41/00 (2006.01)
F02D 41/06 (2006.01)

(52) U.S. Cl.
CPC .......... F02D 41/0085 (2013.01); F02D 41/005 (2013.01); F02D 41/1498 (2013.01); F02D 41/22 (2013.01); F02D 41/30 (2013.01); F02D41/0055 (2013.01); F02D 41/062 (2013.01); Y02T 10/47 (2013.01)

(58) Field of Classification Search
CPC .. F02D 41/22; F02D 41/0085; F02D 41/1498
USPC .......... 701/103, 104, 102, 101, 110; 123/673, 123/436; 73/114.25, 114.26
See application file for complete search history.

(56) References Cited

U.S. PATENT DOCUMENTS 4,134,374 A * 1/1979 Latsch et al. .................. 123/436
6,273,075 B1 * 8/2001 Choi et al. ..................... 123/673
(Continued)

FOREIGN PATENT DOCUMENTS

JP     07286546 A  * 10/1995  .............. F02D 45/00
JP     A-2004-346807     12/2004
JP     2008-51003 A      3/2008
(Continued)

OTHER PUBLICATIONS

May 19, 2015 Office Action issued in Japanese Patent Application No. 2012-122410.

Primary Examiner — Mahmoud Gimie
(74) Attorney, Agent, or Firm — Oliff PLC

(57) ABSTRACT

A controller for internal combustion engine includes a rotation number detecting section to detect engine rotation number and an air-fuel ratio detecting section to detect an air-fuel ratio (A/F) of air-fuel mixture and is configured to perform leaning control of the A/F. The controller further includes a rotation number difference calculating section to calculate a difference between a rotation number variation value of a worst cylinder specified as having largest rotation number variation based on the detected rotation number detected and an average value of rotation number variation values of remaining cylinders other than the worst cylinder; an estimated imbalance rate calculating section to calculate an estimated imbalance rate based on the A/F detected by the air-fuel ratio detecting section; and a lean abnormality detecting section to detect lean imbalance abnormality in a specific cylinder based on the calculated rotation number difference and the calculated estimated imbalance rate.

9 Claims, 4 Drawing Sheets

(56) References Cited

U.S. PATENT DOCUMENTS

2011/0029218 A1* 2/2011 Nakagawa et al. ........... 701/103
2011/0231084 A1 9/2011 Nagakura et al.
2012/0330533 A1* 12/2012 Noda ............................ 701/104

FOREIGN PATENT DOCUMENTS

| JP | A-2011-196195 |   | 10/2011 |
| --- | --- | --- | --- |
| JP | 2012-77713 A |   | 4/2012 |
| JP | 2013019314 A | * | 1/2013 |

* cited by examiner

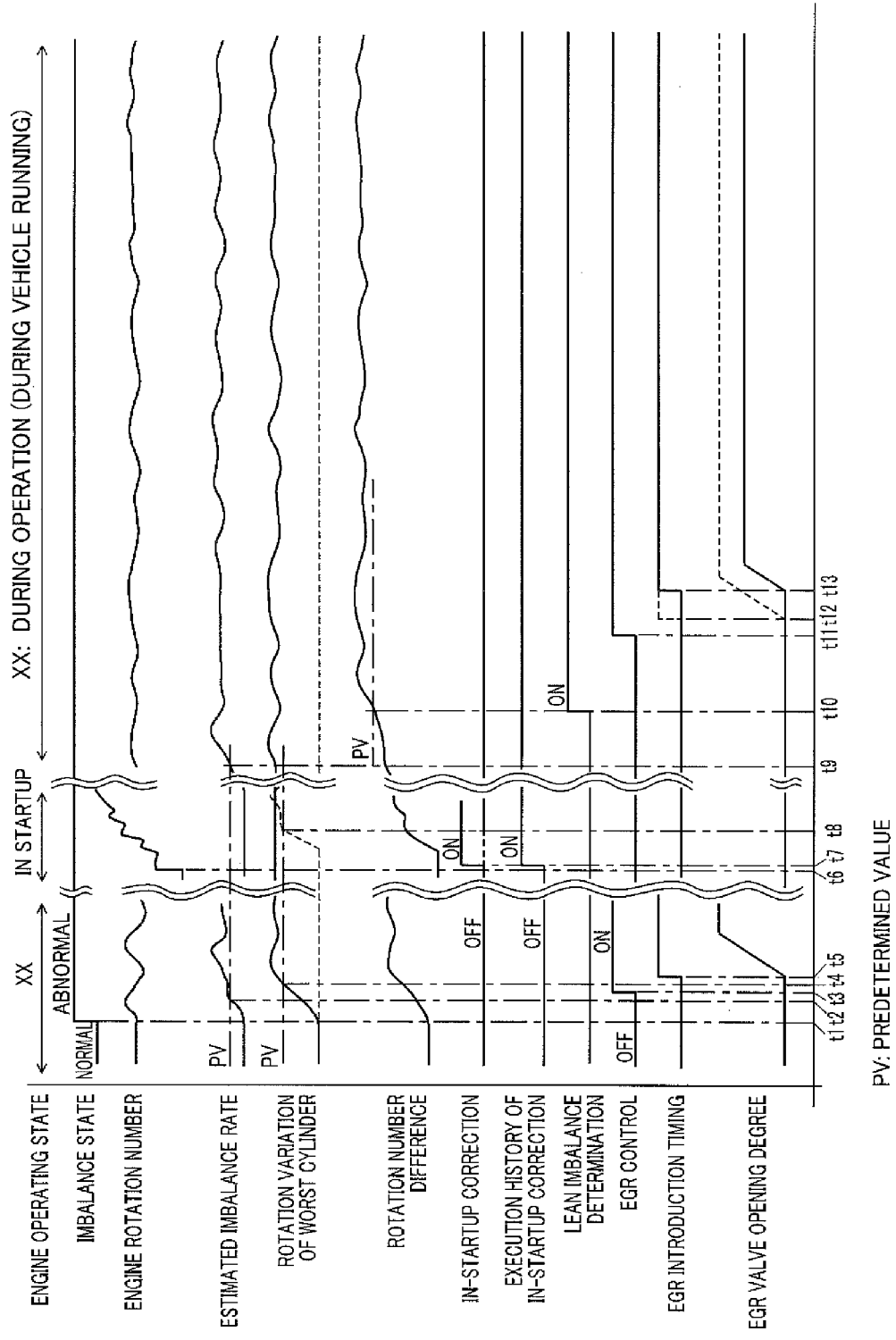

CONTROLLER FOR INTERNAL COMBUSTION ENGINE

CROSS-REFERENCE TO RELATED APPLICATIONS

This application is based upon and claims the benefit of priority from the prior Japanese Patent Application No. 2012-122410, filed May 29, 2012, the entire contents of which are incorporated herein by reference.

BACKGROUND OF THE INVENTION

1. Field of the Invention

The present invention relates to a controller for internal combustion engine to control an engine from cylinder to cylinder to bring an actual air-fuel ratio into a target air-fuel ratio.

2. Related Art

Conventionally, feedback control is performed to bring an air-fuel ratio of an air-fuel mixture to be taken in an engine into a target air-fuel ratio in order to prompt purification of exhaust gas from the engine. This manner of controlling an air-fuel ratio is realized for example by a method of controlling a fuel injection valve to regulate an amount of fuel contained in the air-fuel mixture, a method of controlling an air intake valve to regulate an amount of intake air, and other methods.

For instance, there is known an engine controller to control each cylinder into an optimum air-fuel ratio state (JP 2004-346807A). In this engine controller, an abnormal cylinder determination section determines an abnormal cylinder in which engine rotation variation occurs, based on a rotation angle signal from a rotation angle sensor. A rich/lean determination section determines whether or not an air-fuel ratio is shifted to a rich or lean side relative to a target air-fuel ratio based on an air-fuel ratio signal from an air-fuel ratio sensor. Based on abnormal cylinder information and rich/lean information, a shift level calculating section calculates a shift level of each cylinder. Furthermore, each cylinder injection valve correction amount calculating section calculates a correction amount with respect to a fuel injection amount of a fuel injection valve of each cylinder based on shift level information of each cylinder input from the shift level calculating section.

In such an engine system, part of exhaust gas discharged from an engine is returned to an intake system for the purpose of reducing exhaust emission, improving fuel consumption, and others. This recirculation of exhaust gas to the intake system is performed by an exhaust gas recirculation (EGR) system. To control EGR and others, generally, an EGR pipe is connected between an exhaust pipe and an intake pipe of an engine, and an EGR device (an EGR valve) provided at some midpoint in the EGR pipe to recirculate part of the exhaust gas to the intake system.

SUMMARY OF INVENTION

Problems to be Solved by the Invention

In the technique disclosed in JP 2004-346807A, however, it is determined whether the air-fuel ratio is shifted to a rich or lean side relative to the target air-fuel ratio based on the air-fuel ratio signal from the air-fuel ratio sensor. If a correct value is not detected by the air-fuel ratio sensor, therefore, the rich/lean determination section could not properly make rich/lean determination. Thus, lean abnormality in each cylinder could not be detected accurately.

In the case where an EGR system is installed, if lean abnormality in each cylinder could not be detected accurately, exhaust gas is introduced into a cylinder in which lean abnormality is occurring, resulting in unstable combustion. This may lead to misfire or emission deterioration.

The present invention has a purpose to provide a controller for internal combustion engine to accurately detect lean abnormality in a specific cylinder.

Means of Solving the Problems

To achieve the above purpose, one aspect of the invention provides a controller for internal combustion engine, including a rotation number detecting section to detect engine rotation number and an air-fuel ratio detecting section to detect an air-fuel ratio (A/F) of air-fuel mixture, the controller being configured to perform leaning control of the A/F, the controller further including: a rotation number difference calculating section to calculate a difference between a rotation number variation value of a worst cylinder specified as having largest rotation number variation based on the rotation number detected by the rotation number detecting section and an average value of rotation number variation values of remaining cylinders other than the worst cylinder; an estimated imbalance rate calculating section to calculate an estimated imbalance rate based on the A/F detected by the air-fuel ratio detecting section; and a lean abnormality detecting section to detect lean imbalance abnormality in a specific cylinder based on the rotation number difference calculated by the rotation number difference calculating section and the estimated imbalance rate calculated by the estimated imbalance rate calculating section.

BRIEF DESCRIPTION OF THE DRAWINGS

FIG. 6 is a timing chart showing one example of various control values of lean imbalance abnormality determination processing, in-startup correction, and EGR control, and each state of an engine and an EGR system.

DESCRIPTION OF EMBODIMENTS

Figure 1:
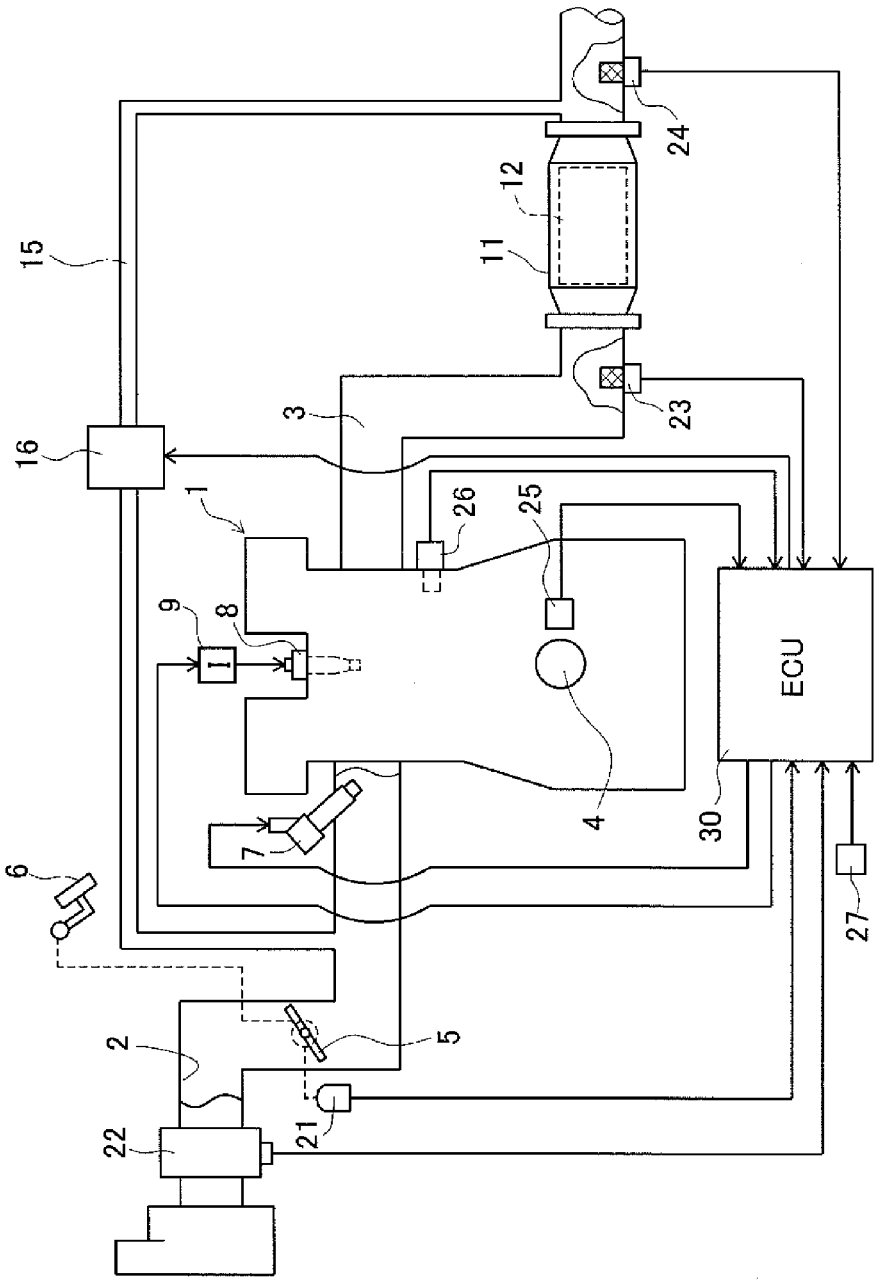
FIG. 1 is a schematic configuration diagram of an engine system including a controller according to an embodiment.

A detailed description of a preferred embodiment of a controller for internal combustion engine embodying the present invention will now be given referring to the accompanying drawings. FIG. 1 is a schematic configuration diagram of an engine system including a controller according to the present embodiment.

As shown in FIG. 1, a multi-cylinder internal combustion engine (hereinafter, referred to as an "engine") 1 having a well-known structure is configured such that a combustible air-fuel mixture of fuel and air supplied through an intake passage 2 is exploded and burnt in a combustion chamber of each cylinder and then the exhaust gas after combustion is discharged through the exhaust passage 3, thereby operating pistons (not shown) to rotate a crank shaft 4 to generate power.

A throttle valve 5 provided in the intake passage 2 is opened and closed to regulate an air amount (an intake air amount) QA allowed to flow through the passage 2 and be taken in each cylinder. This valve 5 is activated in sync with operation of an accelerator pedal 6 provided on a driver's side. A throttle sensor 21 provided for the throttle valve 5 detects an opening degree (a throttle opening degree) TA of the throttle valve 5 and outputs an electric signal representing a detected value thereof. An air flow meter 22 provided in the intake passage 2 measures the intake air amount QA flowing in the intake passage 2 and outputs an electric signal representing a measured value thereof.

A fuel injection valve (an injector) 7 provided for each cylinder injects and supplies fuel into an intake port of a corresponding cylinder. To each injector 7, fuel is supplied under pressure from a fuel supply system (not shown) including a fuel tank, a fuel pump, a fuel pipe, and others.

An ignition plug 8 provided for each cylinder in the engine 1 is operated to ignite in response to high voltage output from an igniter 9. Ignition timing of each ignition plug 8 is determined by output timing of high voltage by the igniter 9.

A catalytic converter 11 provided in the exhaust passage 3 internally contains a three-way catalyst 12 to clean or purify exhaust gas discharged from the engine 1. As well known, the three-way catalyst 12 simultaneously performs the oxidation of carbon monoxide (CO) and hydrocarbon (HC) contained in exhaust gas and the reduction (deoxidation) of nitrogen oxide (NOx), thereby converting three harmful gas components (CO, HC, and NOx) in exhaust gas into harmless carbon dioxide ($CO_2$), water vapor ($H_2O$), and nitrogen ($N_2$). Exhaust gas cleaning capacity of the three-way catalyst 12 is greatly influenced by an air-fuel ratio set for the engine 1. Specifically, when the air-fuel ratio (A/F) is lean, an amount of oxygen ($O_2$) after combustion is increased, thus activating an oxidizing action and inactivating a deoxidizing action. When those oxidizing and deoxidizing actions are balanced (when the air-fuel ratio approaches a theoretical value), the three-way catalyst 12 functions most effectively.

In the exhaust passage 3, an A/F sensor 23 is provided upstream of the three-way catalyst 12 and an $O_2$ sensor 24 is provided downstream of the same. The A/F sensor 23 is used to detect an oxygen concentration Ox of the exhaust gas discharged from the engine 1 to the exhaust passage 3 as an electric current value and converts the electric current value to a voltage value to detect an air-fuel ratio. The $O_2$ sensor 24 is used to detect an oxygen concentration Ox of the exhaust gas having passed through the three-way catalyst 12, and outputs an electric signal representing a detection value thereof.

The rotation speed sensor 25 provided in the engine 1 is used to detect an angular speed of the crank shaft 4, that is, the engine rotation speed NE, and outputs an electric signal representing a detection value thereof. The water temperature sensor 26 provided in the engine 1 is used to detect the temperature of cooling water (cooling-water temperature) THW flowing through the engine 1 and outputs an electric signal representing a detection value thereof. Further, the vehicle speed sensor 27 provided in a vehicle is used to detect the running speed (vehicle speed) SPD of the vehicle and outputs an electric signal representing a detection value thereof.

The electronic control unit (ECU) 30 receives various input signals output from the throttle sensor 21, air flow meter 22, A/F sensor 23, $O_2$ sensor 24, rotation speed sensor 25, water temperature sensor 26, and vehicle speed sensor 27. Based on those input signals, the ECU 30 executes A/F control, fuel injection control including fuel injection amount control and fuel injection timing control, and ignition timing control, and others to control each injector 7 and the igniter 9.

Herein, the A/F control is defined as operations to control each injector 7 based on at least an output signal from the A/F sensor 23 to feedback-control an actual A/F in the engine 1 to a target A/F. The fuel injection control is defined as operations to control each injector 7 according to an operating condition of the engine 1 and thereby control a fuel injection amount and a fuel injection timing. The ignition timing control is defined as operations to control the igniter 9 according an operating condition of the engine 1 and thereby control an ignition timing of each ignition plug 8.

In the present embodiment, the ECU 30 is one example of a rotation number difference calculating section, an estimated imbalance rate calculating section, a lean abnormality determination section, an EGR control section, and in-startup correction section of the present invention. The ECU 30 is provided with well-known components such as a central processing unit (CPU), a read only memory (ROM), a random access memory (RAM), a backup RAM, and others. The ROM stores in advance predetermined control programs related to various controls mentioned above. In accordance with those programs, the ECU 30 executes the various controls and others.

To recirculate part of exhaust gas back to an intake side for each cylinder of the engine 1, an EGR passage 15 is arranged to connect the exhaust passage 3 and the intake passage 2. The EGR passage 15 is provided with an EGR device (an EGR valve) 16 to regulate an EGR amount (a recirculation amount of exhaust gas). The EGR passage 15 extends in the form of a single path from the exhaust passage 3 to the EGR device 16 and branches into a plurality of paths (e.g., four paths in a 4-cylinder engine) each extending from the EGR device 16 to the intake passage 2.

Opening and closing operations of the EGR device 16 are controlled by the ECU 30. That is, the ECU 30 carries out an EGR control routine not shown to execute the EGR control (exhaust gas recirculation control) in which the EGR device 16 is opened and closed during engine operation, thereby recirculating part of exhaust gas to the intake side for each cylinder.

Figure 2:
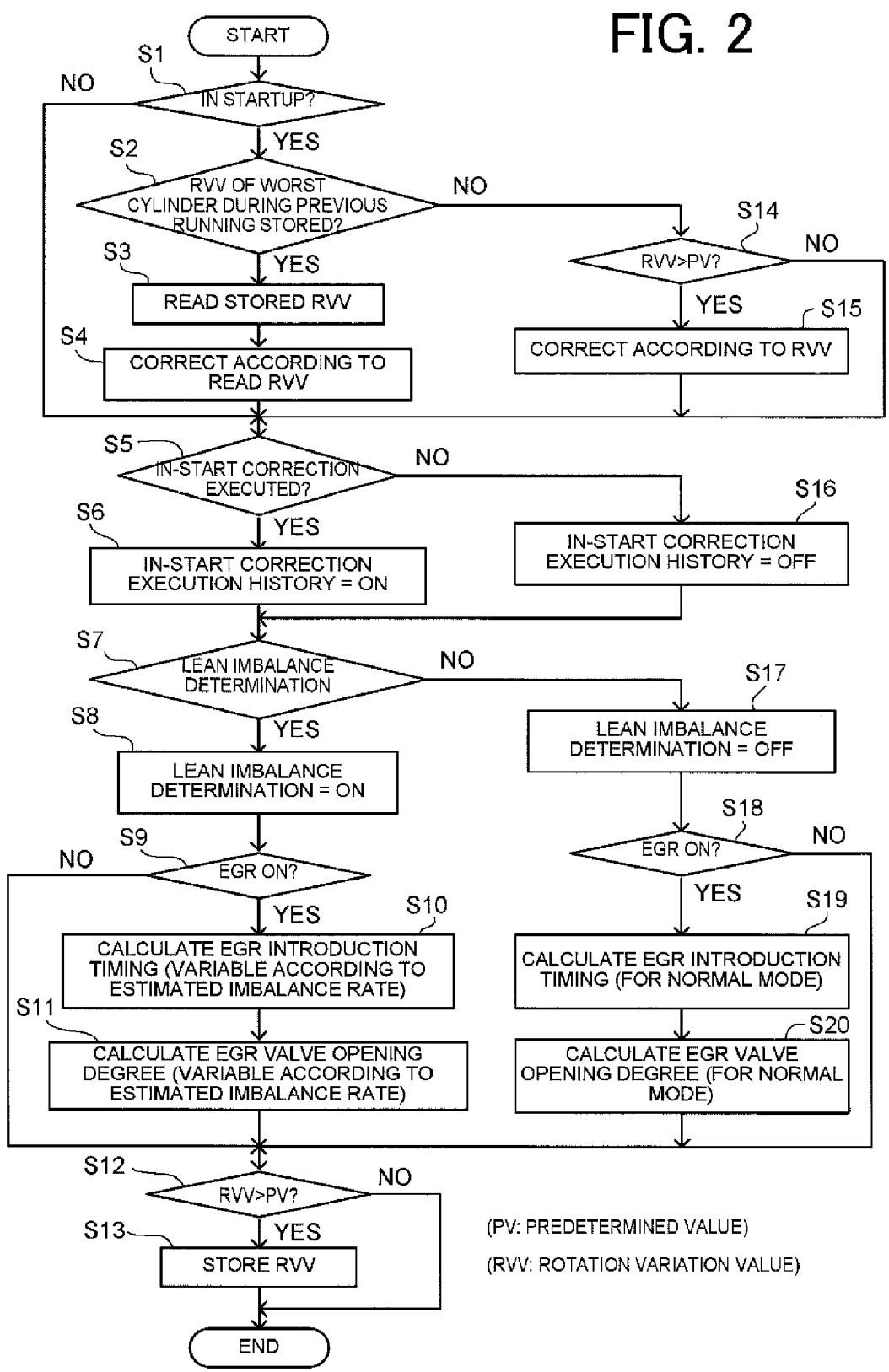
FIG. 2 is a flowchart showing details of lean imbalance abnormality determination processing, in-startup correction control, and EGR control.

Successively, the lean imbalance abnormality determination processing, in-startup correction, and EGR control in the aforementioned engine system are explained referring to FIG. 2. FIG. 2 is a flowchart showing the details of the lean imbalance abnormality determination processing, in-startup correction, and EGR control. This processing routine is repeatedly performed at intervals of several milliseconds.

The ECU 30 firstly determines whether or not the engine 1 is in startup (step S1). If the engine 1 is determined to be in startup (S1: YES), the ECU 30 determines whether or not a rotation variation value (an average value) of a worst cylinder has been stored during previous vehicle running (step S2). The details of a rotation variation value to be determined in step S2 will be explained later.

On the other hand, if the engine 1 is not determined to be in startup (S1: NO), the ECU 30 skips the processings of steps S2-S4 and performs the processing of step S5.

If it is determined in step S2 that the rotation variation value of a worst cylinder has been stored (S2: YES), the ECU 30 reads the rotation variation value of the worst cylinder stored during previous vehicle running (step S3). Based on the rotation variation value read in step S3, a correction amount of a fuel injection amount in the worst cylinder is determined and the fuel injection amount in startup is corrected (step S4).

Figure 3:
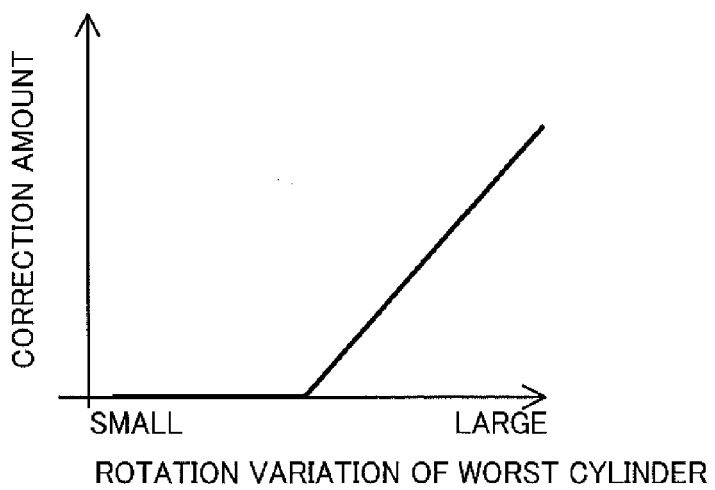
FIG. 3 is a graph showing a calculation map for correction amount of fuel injection amount in startup.

In the present embodiment, specifically, the correction amount of the fuel injection amount is calculated for example so as to be gradually larger as the rotation variation amount increases after the rotation variation value of the worst cylinder exceeds a predetermined value as shown in FIG. 3. In other words, an incremental quantity of fuel in startup is increased as the rotation variation value is larger. This enables correction of incremental quantity of the fuel injection amount at an early stage right after startup. In case lean imbalance abnormality occurs, emission and driveability in startup can be enhanced.

On the other hand, if it is determined in the processing of step S2 that the rotation variation value of the worst cylinder has not been stored (S2: NO), the ECU 30 determines whether or not the rotation variation value of the worst cylinder in startup is larger than a predetermined value (step S14). If it is determined in this step S14 that the rotation variation value of the worst cylinder in startup is larger than the predetermined value (S14: YES), the ECU 30 decides a correction amount of the fuel injection amount in the worst cylinder based on the rotation variation value of the worst cylinder in startup by referring to map data in FIG. 3, and executes correction of the fuel injection amount in startup (step S15). If it is determined in the step S14 that the rotation variation value of the worst cylinder in startup is equal to or less than the predetermined value (S14: NO), the ECU 30 skips the processing of step S15 and performs the processing of step S5.

The above processings of S1-S4, S14, and S15 are performed in the in-startup correction control by an in-startup correction section of the present invention.

Successively, the ECU 30 determines whether or not the in-startup correction has been executed (step S5). This determination is performed to judge whether or not the processing of step S4 or S15 has been conducted. If it is determined that the in-startup correction was executed (S5: YES), the ECU 30 turns ON an in-startup correction execution history flag (step S6). If it is determined that the in-startup correction was not executed (S5: NO), the ECU 30 turns OFF the in-startup correction execution history flag (step S16).

Thereafter, the ECU 30 determines whether or not lean imbalance abnormality is occurring in the i-th cylinder (e.g., i=1 to 4 in a 4-cylinder engine) (step S7). In the present embodiment, specifically, this determination on whether or not the lean imbalance abnormality is occurring in the i-th cylinder is performed based on a rotation number difference defined as a difference between a rotation number variation value of a worst cylinder (the i-th cylinder) and rotation number variation values of remaining cylinders other than the worst cylinder, which are calculated based on the number of rotation detected by the rotation speed sensor 25, an estimated imbalance rate calculated based on A/F detected by the A/F sensor 23, and the in-startup correction execution flag. The processing of this step S7 is referred to as a determination of lean imbalance abnormality by a lean abnormality detection section of the invention.

Herein, a brief explanation is given to a method of calculating the rotation number difference. Firstly, referring to the rotation number (angular speed) detected by the rotation speed sensor 25, a cylinder whose angular speed per crank angle of 30° CA is slowest is specified as a worst cylinder. Secondly, a rotation number variation value (N-time average value) of the worst cylinder and rotation number variation values (N-time average value) of remaining cylinders other than the worst cylinder are calculated. Then, a difference between the rotation number variation value (N-time average value) of the worst cylinder and the rotation number variation values (N-time average value) of remaining cylinders other than the worst cylinder is calculated and referred to as a rotation number difference.

The estimated imbalance rate is a value that becomes larger or smaller (i.e., that monotonically increases or monotonically decreases) as the degree of difference (degree of imbalance) is larger. This value varies according to an A/F variation accumulated value obtained based on an output value of the air-fuel ratio sensor.

In step S7, if the rotation number difference is larger than a predetermined value set in advance, the estimated imbalance rate is equal to or larger than a predetermined value set in advance, and the in-startup correction execution history flag is ON, the ECU 30 determines that the lean imbalance abnormality is occurring. On the other hand, if at least one of the conditions that the rotation number difference is equal to or less than the predetermined value, the estimated imbalance rate is smaller than the predetermined value, and the in-startup correction execution history flag is OFF is met, the ECU 30 determines that the lean imbalance abnormality is not occurring.

In the present embodiment, as mentioned above, the estimated imbalance rate is used for detection of the lean imbalance abnormality without dividing the A/F variation value used for detection of lean imbalance abnormality to a rich side and a lean side. Furthermore, a state of the in-startup correction execution history flag is also added to criteria for determination. Because of the above, robust property of determination of lean imbalance abnormality can be improved. Accordingly, even if A/F detected by the A/F sensor 23 is not precise, it is possible to accurately detect the lean imbalance abnormality in the i-th cylinder.

In the present embodiment, the state of the in-startup correction execution history flag is used for determining presence/absence of the lean imbalance abnormality, but this is not an essential condition. Specifically, since the presence/absence of the lean imbalance abnormality is determined based on at least the rotation number difference and the estimated imbalance rate, the lean imbalance abnormality in the i-th cylinder can be detected accurately by simple control.

If it is determined in step S7 that lean imbalance abnormality is occurring in the i-th cylinder (S7: YES), the ECU 30 turns ON the lean imbalance determination flag (step S8) and performs the processing of step S9. On the other hand, if is it determined in step S7 that lean imbalance abnormality is not occurring in any of the cylinders (S7: NO), the ECU 30 turns OFF the lean imbalance determination (step S17) and performs the processing of step S18.

In step S9, the ECU 30 determines whether or not EGR control is in execution, If the EGR control is in execution (S9: YES), the ECU 30 calculates an introduction start timing of exhaust gas according to the estimated imbalance rate (step S10), and calculates an opening degree of the EGR device 16 according to the estimated imbalance rate (step S11). Thus, the ECU 30 executes the EGR control based on the introduction start timing and the opening degree respectively calculated in S10 and S11. This processing is referred to as exhaust gas introduction restriction control by the EGR control section of the invention.

If the EGR control is not in execution (S9: NO), the processings of the steps S10 and S11 are skipped and the processing of step S12 is performed.

Figure 4:
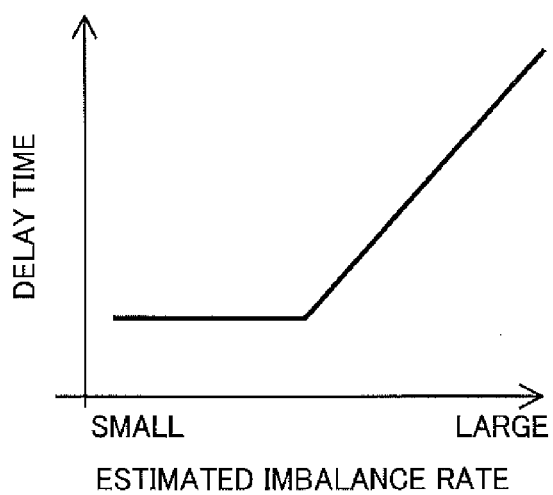
FIG. 4 is a graph showing a calculation map for EGR introduction timing.
Figure 5:
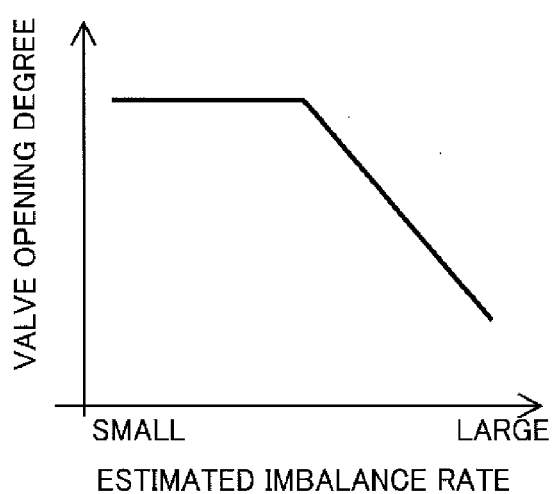
FIG. 5 is a graph showing a calculation map of opening degree of an EGR device.

In the present embodiment, in the processing of step S10, for example, a delay time of the exhaust gas introduction start timing is calculated so that it is gradually increased as the estimated imbalance rate is increased after the estimated imbalance rate exceeds a predetermined value as shown in FIG. 4. In addition, in the processing of step S11, for example, the opening degree of the EGR device 16 can be calculated so that it is gradually decreased as the estimated imbalance rate is increased after the estimated imbalance rate exceeds a predetermined value as shown in FIG. 5.

The above processing can restrict the introduction of exhaust gas to the i-th cylinder in which lean imbalance abnormality is occurring. Accordingly, this can avoid excessive introduction of exhaust gas to the i-th cylinder and thereby reliably prevent misfire or emission deterioration.

On the other hand, in the processing of step S18, the ECU 30 also determines whether or not the EGR control is in execution. If the EGR control is being executed (S18: YES), the ECU 30 calculates the exhaust gas introduction start timing (step S19) and also calculates the opening degree of the EGR device 16 (step S20) by a similar method to a conventional manner. Based on the introduction start timing and the opening degree calculated respectively in S19 and S20, the ECU 30 executes the EGR control. This processing is conventionally performed EGR control.

If the EGR control is not being executed (S18: NO), the processings of steps S19 and S20 are skipped and the processing of step S12 is performed.

The ECU 30 determines whether or not a rotation number variation value of the worst cylinder is larger than the predetermined value set in advance (step S12). The rotation number variation value of the worst cylinder used in step S12 is an N-time average value. If it is determined in this step S12 that the rotation number variation value of the worst cylinder is larger than the predetermined value (S12: YES), the ECU 30 stores that rotation number variation value (step S13). Specifically, while it is considered that the lean imbalance abnormality is occurring, the rotation number variation value of the worst cylinder detected at that time is stored. By use of this rotation number variation value of the worst cylinder stored at that time, as mentioned above, during startup of the engine 1, the ECU 30 is arranged to correct the fuel injection amount at an early stage right after startup of the engine 1 (see the processings in S1 to S4).

Next, various control values and each state of the engine and the EGR system during execution of the above processing will be explained referring to FIG. 6. FIG. 6 is a timing chart showing one example of various control values in the lean imbalance abnormality determination processing, in-startup correction and EGR control, and each state of the engine and the EGR system. This example shows a case where lean imbalance abnormality takes place in the engine 1 during operation (during vehicle running).

At a time t1, when lean imbalance abnormality occurs, the estimated imbalance rate, the rotation number variation value and the rotation number difference of a worst cylinder individually start to increase. At a time t2, the estimated imbalance rate becomes equal to or larger than a predetermined value. However, the rotation number difference is equal to or less than a predetermined value and thus the lean imbalance determination flag remains OFF (S7: NO, S17 in FIG. 2). At a time t3, the EGR control is started (S17, S18: YES, S19, S20 in FIG. 2). The EGR control at that time is similar to a conventional manner.

At a time t4, the rotation number variation value of the worst cylinder exceeds the predetermined value. Thus, an average value of the rotation number variation for a predetermined time from the time t4 is calculated and stored as a rotation number variation value (S12: YES, S13 in FIG. 2). Thereafter, at a time t5, introduction of exhaust gas is started and the EGR device 16 is opened.

The time when the engine 1 is started up is explained below. Upon startup of the engine 1, cranking is started at a time t6 and the in-startup correction is carried out at a time t7 (S1: YES in FIG. 2). Since the rotation number variation value of the worst cylinder detected during previous vehicle running has been stored, this in-startup correction is executed according to the stored rotation number variation value. In other words, in startup, the rotation number variation value of the worst cylinder during the previous running is retained and an incremental quantity of the fuel injection amount in startup is corrected (S2: YES, S3, S4 in FIG. 2). The in-startup correction execution history flag is turned ON (S5: YES, S6 in FIG. 2).

In the present embodiment, accordingly, the fuel injection amount can be corrected at an early stage right after startup as compared with the conventional art in which a rotation number variation value of a worst cylinder exceeds a predetermined value at a time t8 and in-startup correction is performed (see a broken line in FIG. 6). Accordingly, the present embodiment can improve emission and driveability in startup in case lean imbalance abnormality is occurring.

Thereafter, at a time t9 during vehicle running, the estimated imbalance rate becomes a predetermined value or more. However, in this stage, the rotation number difference of the worst cylinder is equal to or less than the predetermined value. It is thus determined that the lean imbalance abnormality is not occurring. The lean imbalance determination flag remains OFF (S7: NO, S17 in FIG. 2).

At a time t10, the rotation number difference exceeds the predetermined value. At that time, the in-startup correction execution history flag is ON and the estimated imbalance rate is equal to or more than the predetermined value. Accordingly, it is determine that the lean imbalance abnormality is occurring. Thus, the lean imbalance determination flag is turned ON (S7: YES, S8 in FIG. 2).

At a time t11, thereafter, the EGR control is started (EGR ON). In conventional control, an EGR device is activated at a time t12, slightly delayed from the time t11, to start introduction of exhaust gas.

In the present embodiment, in contrast, the EGR device 16 is activated at a time t13 later than the time t12 to start introduction of exhaust gas (S10, S11 in FIG. 2). As shown in FIG. 6, the opening degree of the EGR device 16 is set smaller than in the conventional art. This can limit introduction of exhaust gas to the i-th cylinder in which lean imbalance abnormality is occurring. Accordingly, excessive introduction of exhaust gas to the i-th cylinder is not caused. Thus, misfire and emission deterioration can be reliably prevented.

According to the controller of the present embodiment explained in detail above, the ECU 30 is arranged to determine that the lean imbalance abnormality is occurring when the following conditions are met: that the rotation number difference is larger than the predetermined value set in advance; that the estimated imbalance rate is equal to or larger than the predetermined value set in advance; and that the in-startup correction execution history flag is ON. In this way, the estimated imbalance rate corresponding to the A/F variation accumulated value is used for detection of lean imbalance abnormality without dividing the A/F variation value used for detection of lean imbalance abnormality into the rich side and the lean side. Further, the state of the in-startup correction execution history flag is also added to the determination criteria. From those conditions, the robust property of detection of lean imbalance abnormality can be improved. Even if the A/F detected by the A/F sensor 23 is not precise, the lean imbalance abnormality in the i-th cylinder can be detected accurately.

In the case where the lean imbalance abnormality is occurring, when EGR control is to be executed, the ECU 30 calculates the introduction start timing of exhaust gas and the opening degree of the EGR device 16, and executes the EGR control. This makes it possible to restrict introduction of exhaust gas to the i-th cylinder in which the lean imbalance abnormality is occurring. Thus, excessive introduction of exhaust gas to the i-th cylinder is not caused. Misfire and emission deterioration can be reliably prevented.

In the case where the rotation number variation value of the worst cylinder during the previous vehicle running has been stored, in startup of the engine 1, the ECU 30 determines the correction amount of the fuel injection amount in the worst cylinder based on the stored rotation number variation value and corrects the fuel injection amount for startup. This allows correction of an incremental quantity of the fuel injection amount at an early stage right after startup. Accordingly, emission and driveability in startup can be improved in case the lean imbalance abnormality is occurring.

The above embodiment is a mere example and does not any limitation to the invention. The present invention may be embodied in other specific forms without departing from the essential characteristics thereof. For instance, although the above embodiment exemplifies an engine system equipped with the exhaust gas recirculation system, part of the invention may be applied to an engine system equipped with no exhaust gas recirculation system.

The invention claimed is:

1. A controller for internal combustion engine, including a rotation number detecting section to detect engine rotation number and an air-fuel ratio detecting section to detect an air-fuel ratio (A/F) of air-fuel mixture, the controller being configured to perform leaning control of the A/F, the controller further including:
    a rotation number difference calculating section to calculate a difference between a rotation number variation value of a worst cylinder specified as having largest rotation number variation based on the rotation number detected by the rotation number detecting section and an average value of rotation number variation values of remaining cylinders other than the worst cylinder;
    an estimated imbalance rate calculating section to calculate an estimated imbalance rate based on the A/F detected by the air-fuel ratio detecting section; and
    a lean abnormality detecting section to detect lean imbalance abnormality in a specific cylinder based on the rotation number difference calculated by the rotation number difference calculating section and the estimated imbalance rate calculated by the estimated imbalance rate calculating section.

2. The controller for internal combustion engine according to claim 1, wherein the lean abnormality detecting section determines that lean imbalance abnormality is occurring in a cylinder in which the rotation number difference calculated by the rotation number difference calculating section is larger than a predetermined value set in advance and the estimated imbalance rate calculated by the estimated imbalance rate calculating section is equal to or larger than a predetermined value.

3. The controller for internal combustion engine according to claim 1, further including an exhaust gas recirculation system including an EGR passage to allow exhaust gas to recirculate in each cylinder, an EGR device to regulate a flow rate of the exhaust gas to be recirculated, and an EGR control section to control operation of the EGR device,
    wherein the EGR control section controls the EGR device to restrict introduction of exhaust gas when the lean imbalance abnormality is detected by the lean abnormality detecting section.

4. The controller for internal combustion engine according to claim 3, wherein the EGR control section controls the EGR device to restrict introduction of exhaust gas by controlling at least one of an introduction amount of exhaust gas and an introduction start timing of exhaust gas based on the estimated imbalance rate.

5. The controller for internal combustion engine according to claim 4, wherein when the exhaust gas introduction amount is to be adjusted based on the estimated imbalance rate, the EGR control section controls an opening degree of the EGR device to be gradually decreased as the estimated imbalance rate is gradually increased after the estimated imbalance rate exceeds a predetermined value.

6. The controller for internal combustion engine according to claim 4, wherein when the exhaust gas introduction start timing is to be adjusted based on the estimated imbalance rate, the EGR control section controls a delay time of the exhaust gas introduction start timing to be gradually increased as the estimated imbalance rate is increased after the estimated imbalance rate exceeds a predetermined value.

7. The controller for internal combustion engine according to claim 1, further including an in-startup correction section to correct a fuel injection amount in engine startup,
    wherein when the rotation number variation value of the worst cylinder in engine startup is larger than a predetermined value set in advance, the in-startup correction section corrects the fuel injection amount in the worst cylinder based on the rotation number variation value of the worst cylinder.

8. The controller for internal combustion engine according to claim 7, wherein when the rotation number variation value of the worst cylinder during operation of the internal combustion engine is larger than the predetermined value set in advance, the in-startup correction section stores an average value of rotation number variation values for a subsequent predetermined period and in next engine startup, corrects a fuel injection amount of the worst cylinder based on the stored rotation number variation value.

9. The controller for internal combustion engine according to claim 7, wherein the in-startup correction section corrects the fuel injection amount to be gradually increased as the rotation number variation value of the worst cylinder is increased.

* * * * *